(12) United States Patent
Yarita et al.

(10) Patent No.: US 8,751,962 B2
(45) Date of Patent: Jun. 10, 2014

(54) REMOTE CONTROL, DISPLAY DEVICE, TELEVISION RECEIVER DEVICE, AND PROGRAM FOR REMOTE CONTROL

(75) Inventors: Takeshi Yarita, Osaka (JP); Keiichiro Sato, Osaka (JP); Takamasa Shimizu, Osaka (JP); Jiro Okada, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 13/977,923

(22) PCT Filed: Dec. 27, 2011

(86) PCT No.: PCT/JP2011/080186
§ 371 (c)(1),
(2), (4) Date: Jul. 2, 2013

(87) PCT Pub. No.: WO2012/093620
PCT Pub. Date: Jul. 12, 2012

(65) Prior Publication Data
US 2013/0290901 A1  Oct. 31, 2013

(30) Foreign Application Priority Data

Jan. 7, 2011 (JP) .................................. 2011-002231
Dec. 9, 2011 (JP) .................................. 2011-270720

(51) Int. Cl.
*G06F 3/048* (2013.01)
(52) U.S. Cl.
USPC ........................... 715/810; 715/848; 715/766
(58) Field of Classification Search
CPC .................... G08C 2201/30; H04N 2005/443; G06F 3/04886
USPC .......................................... 715/766, 810, 848
See application file for complete search history.

(56) References Cited

U.S. PATENT DOCUMENTS

2003/0095211 A1* 5/2003 Nakajima ..................... 348/734
2006/0107294 A1* 5/2006 Rivlin et al. .................... 725/80
(Continued)

FOREIGN PATENT DOCUMENTS

JP   11-298822 A   10/1999
JP   2001-22508 A   1/2001
JP   2001-136585 A   5/2001

OTHER PUBLICATIONS

Remote Control for Zoomable UI on TV IP.com Oct. 29, 2007 6 pages.*

(Continued)

*Primary Examiner* — Andrea Long
(74) *Attorney, Agent, or Firm* — Birch, Stewart, Kolasch & Birch, LLP

(57) ABSTRACT

In regards to the conventional technology for performing operational inputs by referring a GUI and by means of a touch sensor, there exists a problem in which the relationship of correspondence between on-screen locations of selection items on a GUI and touchpad locations cannot be accurately grasped. Moreover, cases in which a touch panel equipped with an information display function instead of a touch sensor is used cause problems in that the cost thereof or power consumed thereby can be relatively high, etc. In order to solve the problems described as above, the present invention provides a remote control that selects an icon on a GUI as a target of operation using a touch sensor, and which is characterized by a configuration that allows a user to easily identify the relationship of correspondence by brightening of a touch sensor on a touchpad corresponding to icon arrangement on a GUI.

12 Claims, 18 Drawing Sheets

(56) References Cited

U.S. PATENT DOCUMENTS

2006/0230156 A1* 10/2006 Shappir et al. ............... 709/227
2011/0138416 A1* 6/2011 Kang et al. .................... 725/39

OTHER PUBLICATIONS

International Search Report issued in PCT/JP2011/080186, mailed on Mar. 13, 2012.

* cited by examiner

Fig.1
a)
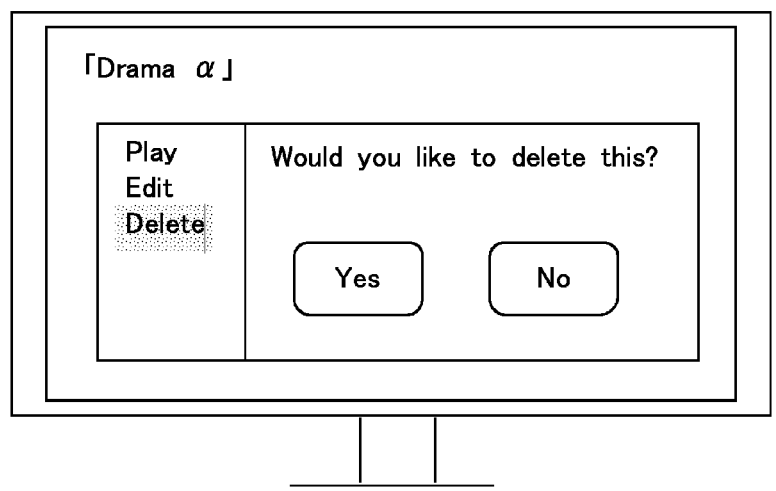
b)
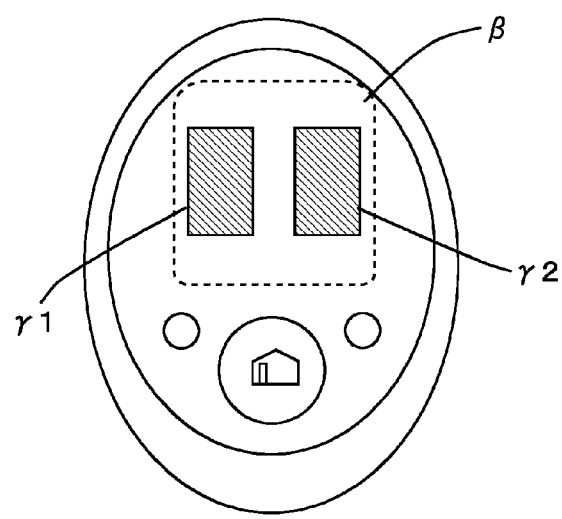

Fig.2
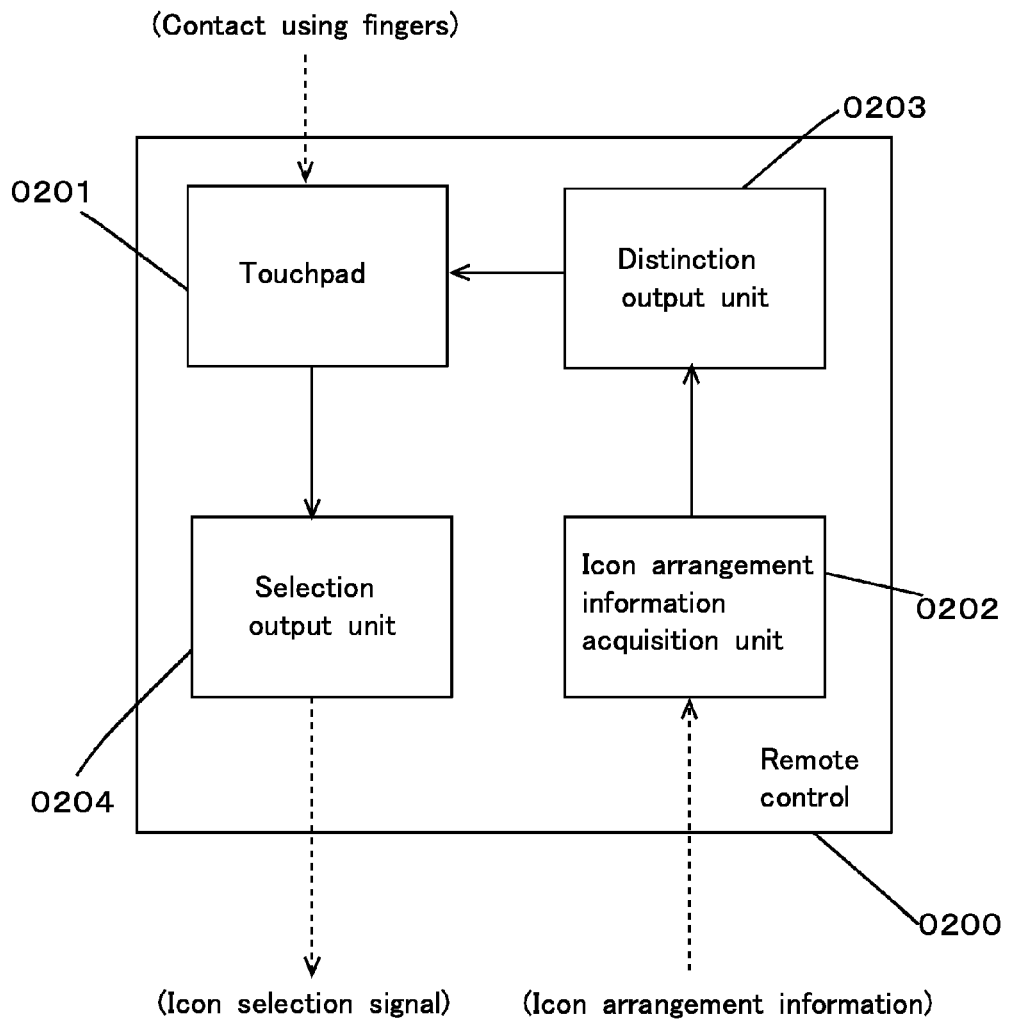
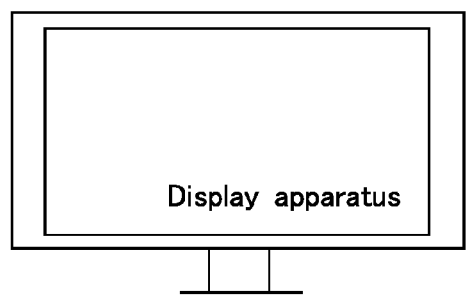

Fig.4 a)

| Area distinction information | Distinction information for detector elements |
|---|---|
| Upper-left area | A1−2、B1−2 |
| Upper-right area | E1−2、F1−2 |
| Lower-left area | |
| ⋮ | ⋮ | b)

| GUI type distinction information | Distinction information for detector elements |
|---|---|
| Screen resulting from a choice between two selection screens (next to each other) | Left: A2−5、B2−5<br><br>Right: E2−5、F2−5 |
| ⋮ | ⋮ |
| Electronic program guide | C1−6、D1−6<br>A3−4、B3−4<br>E3−4、F3−4 |
| ⋮ | ⋮ |

Fig.5
a)
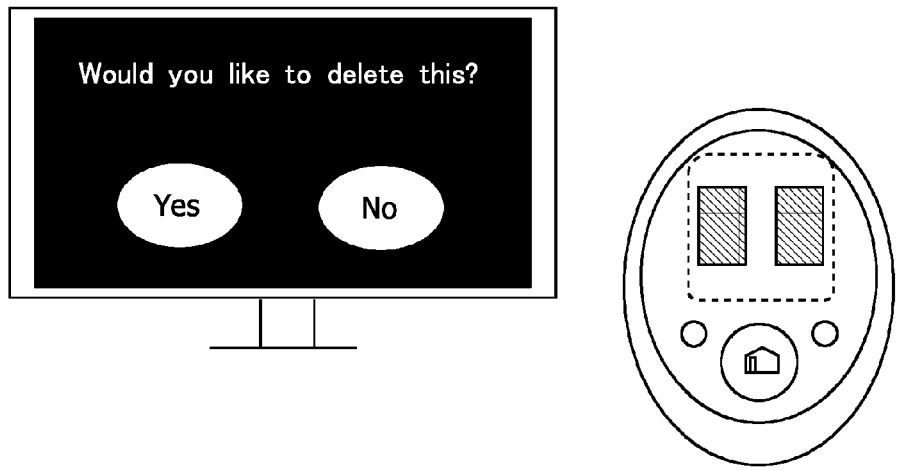
b)
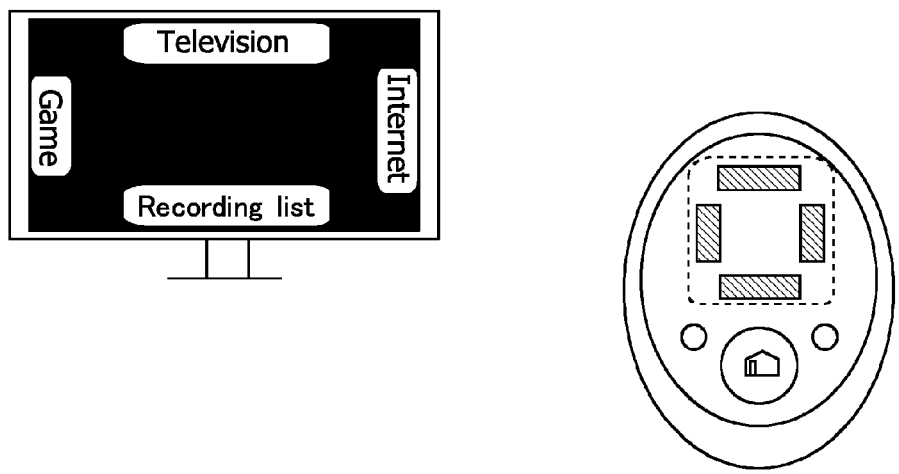

Fig.9
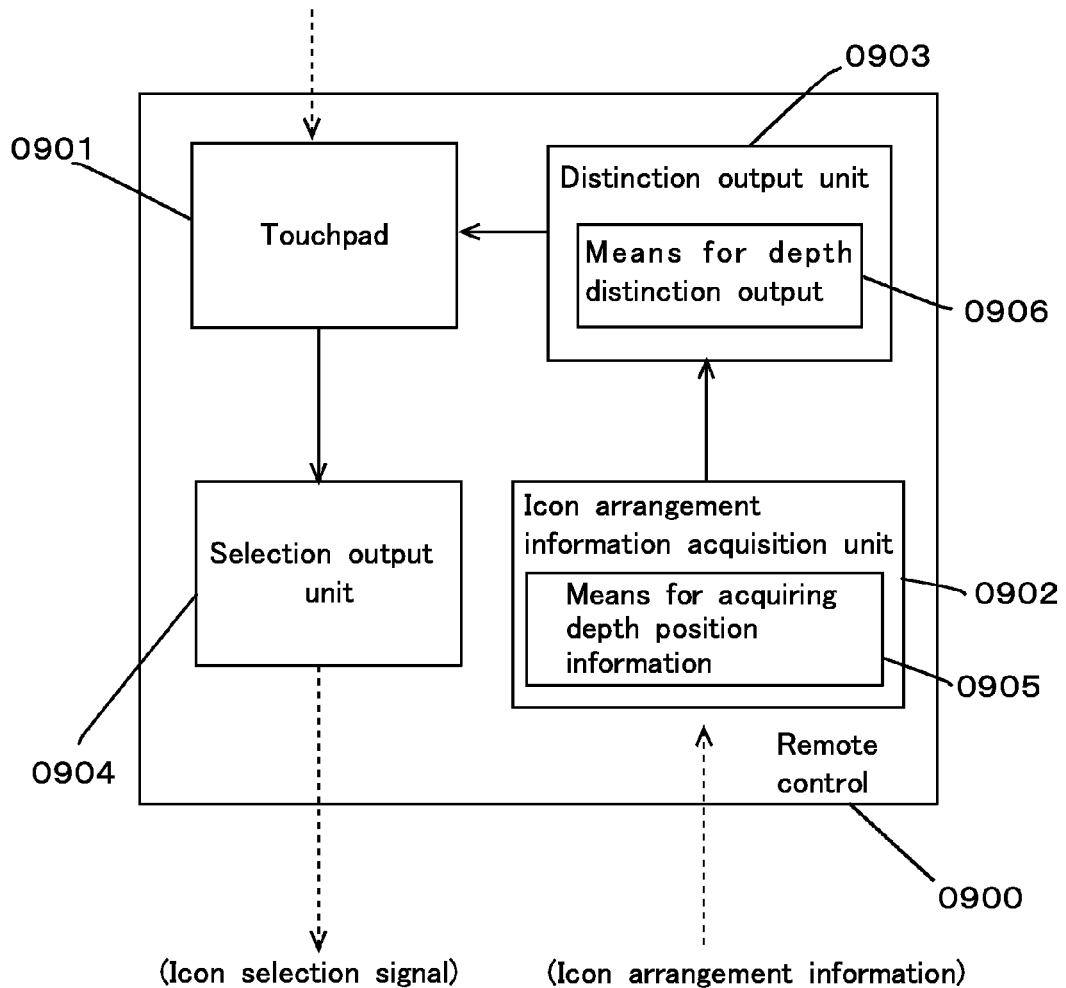
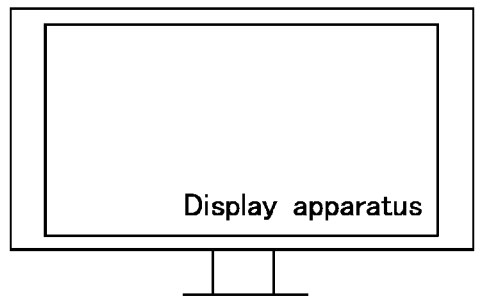

Fig.10
a)
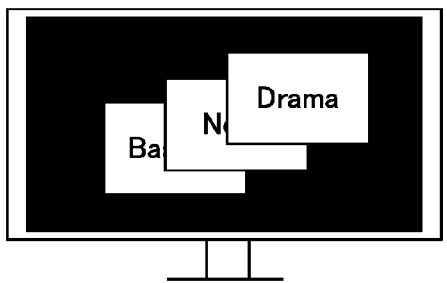 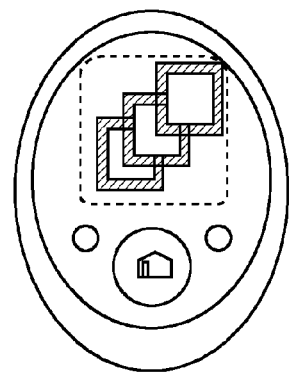
b)
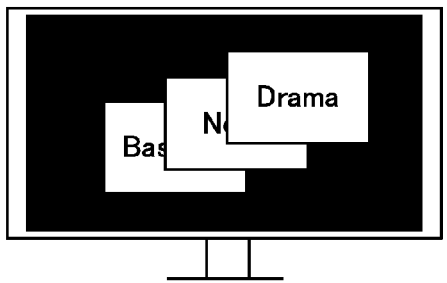 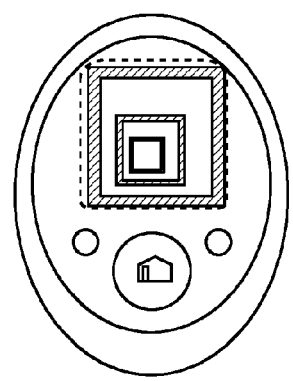

Fig.12
a)
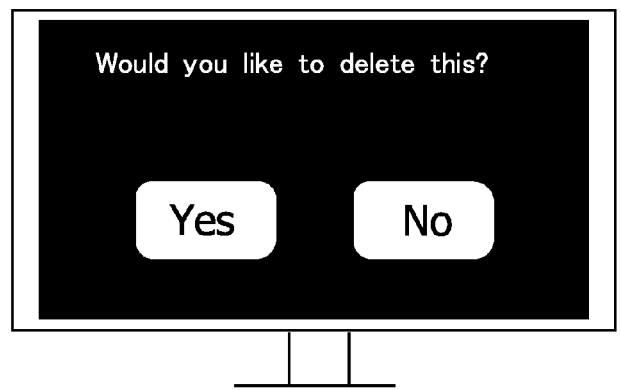
b)
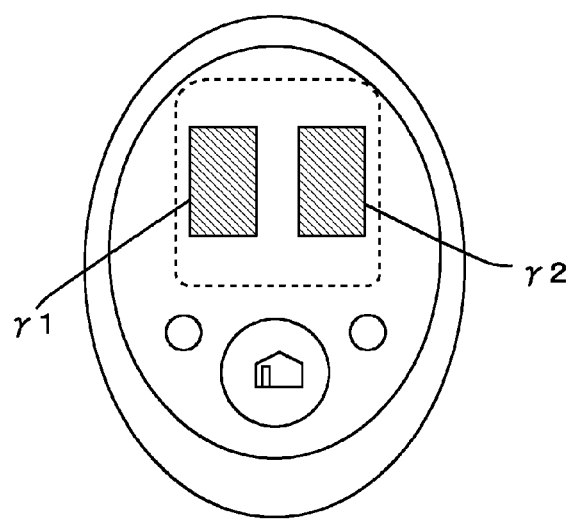

Fig.15
a)
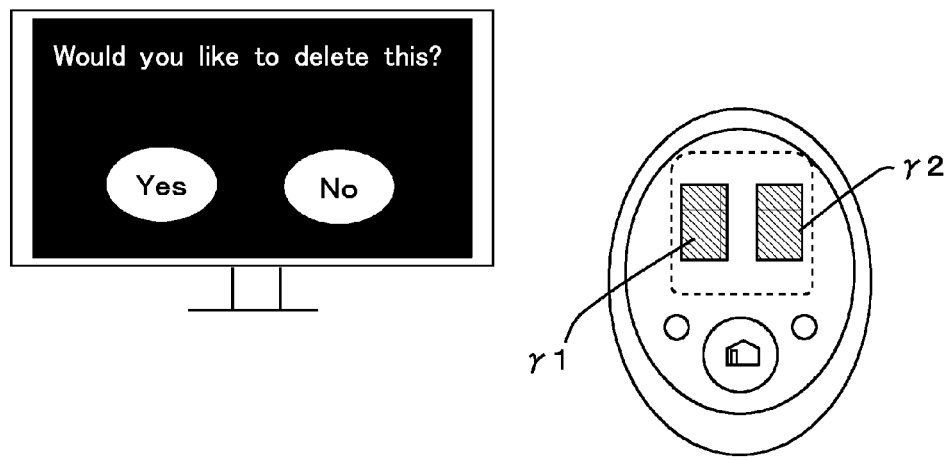
b)
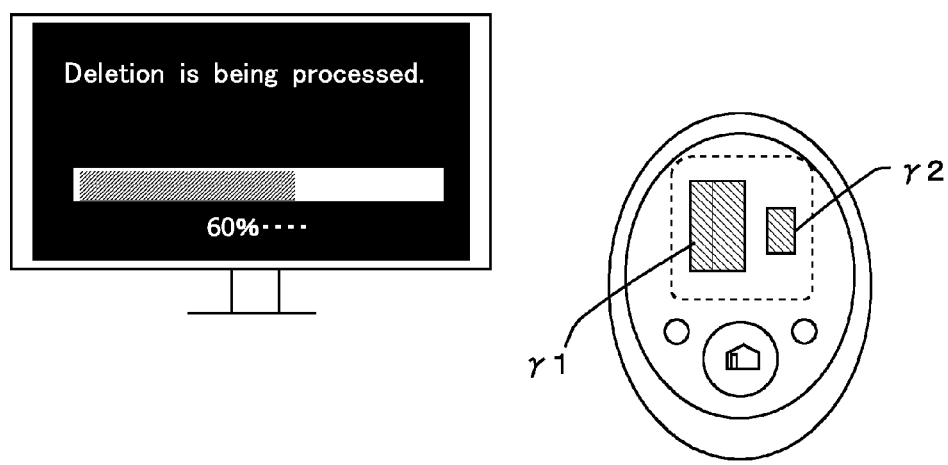

Fig.17
a)
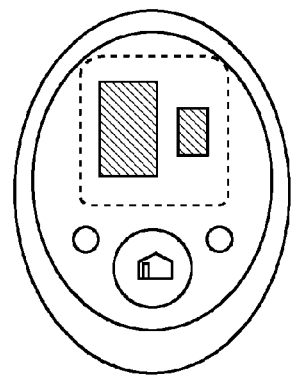
b)
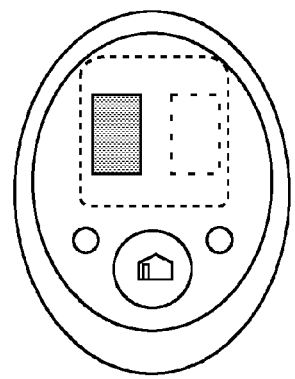
c)
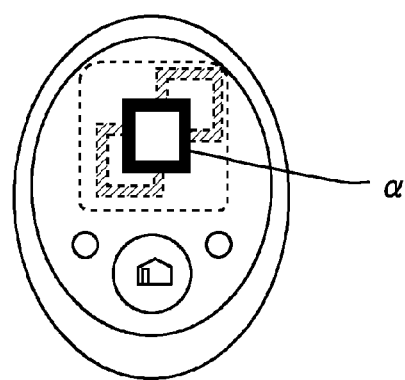

REMOTE CONTROL, DISPLAY DEVICE, TELEVISION RECEIVER DEVICE, AND PROGRAM FOR REMOTE CONTROL

FIELD OF THE INVENTION

The present invention relates to a remote control whereby operational inputs by means of a GUI (Graphical User Interface) are performed using a touch sensor.

BACKGROUND ART

Conventionally, remote controls for household electrical appliances, such as television sets and electronic devices, have been generally used as input devices for remote operation. Recently, remote controls equipped with touch sensors, which can be operated by detecting contacts made with the fingers, etc., have also been provided. For such remote controls operated by touch, when selecting from among selection items displayed on a GUI as a target of operation, an area on the touchpad corresponding to the display location of the selection item on the GUI is tapped. Specifically, for instance, thumbnail images of four recorded programs are arranged in a 2×2 pattern and displayed on a GUI as a recording list. When a thumbnail image of a program that is desired to be deleted is displayed in the lower-left area on a GUI, the user accordingly taps on the lower-left area of the touchpad of the remote control.

Moreover, when "Yes" and "No" are arranged next to each other and displayed on a GUI for confirmation of whether or not it is acceptable to delete the above-mentioned selected data for recorded programs, the user taps the left side of the touchpad of the remote control and deletes the desired data for recorded programs.

As described above, the remote control that can be operated by touch by means of a touch sensor enables universal operation. That is to say, the remote control can be utilized for completely separate operations based on GUIs, and therefore, it is possible to carry out various operations for various operation targets without increasing the number of operation buttons.

Moreover, in Kokai (Jpn. unexamined patent publication) No. 2001-022508, the following technology has been disclosed: A remote control having a touch panel as a touch sensor equipped with an information display function that has information about operation button images based on operation targets (e.g., in case that an operation target is a television device, a channel button and a volume control button may apply; in the case of a printer, a print button may apply). It also accepts relevant operational inputs based on the displaying of the operation button images on the touch panel in accordance with the operation target.

Patent Reference 1: Kokai (Jpn. unexamined patent publication) No. 2001-022508

DISCLOSURE OF THE INVENTION

Problems to be Solved by the Invention

In regards to the aforementioned technology for performing operational inputs by referring a GUI and by means of a touch sensor, there exists a problem in which the relationship of correspondence between on-screen locations of selection items on a GUI and touchpad locations cannot be accurately grasped. Therefore, it may not be possible to perform accurate operational inputs so that the locations on the touchpad touched based on estimate differ from those for desired selection items.

Additionally, with the technology of Kokai (Jpn. unexamined patent publication) No. 2001-022508, touch operations are not performed in reference to a GUI displayed on the target of operations, such as a television, etc. Therefore, it is necessary to indicate to users the nature of relevant operations solely using operation buttons on a remote control. Therefore, in regards to the remote control of Kokai (Jpn. unexamined patent publication) No. 2001-022508, it is necessary to use a touch panel equipped with an information display function rather than a mere touch sensor. This causes problems such as relatively high prices, high power consumption, etc. Moreover, such remote control is not thought to contribute to improvement of operability taking into account the relationship of correspondence between arrangement positions of selection items, such as "Yes" and "No" on a GUI, and contact positions of a touch panel as a matter of course.

Means for Solving the Problems

In order to solve the problems described above, the present invention provides a remote control that selects an icon on a GUI as a target of operation using a touch sensor, and which is characterized by a configuration that allows a user to easily identify the relationship of correspondence by brightening of a touch sensor on a touchpad corresponding to icon arrangement on a GUI. Specifically, a remote control provided with a function for icon selection on a GUI of a display apparatus comprising a touchpad including touch sensors, an icon arrangement information acquisition unit for acquiring icon arrangement information on the GUI, a distinction output unit, outputting distinction for touching guidance of the touch sensor on the touchpad corresponding to the icon arrangement information on the GUI, and a selection output unit for outputting a selection signal specifying the icon of the corresponding GUI resulting from touching of the touch sensor on the touchpad performed based on the distinction.

In addition to the aforementioned configuration, the remote control wherein the icon arrangement information acquisition unit comprises means for acquiring depth position information about a plurality of icons aligned in the depth direction on the GUI, and wherein the distinction output unit comprises means for depth distinction output for outputting the distinction aligned in the depth direction for touching guidance on the touchpad based on the acquired depth position information is provided. In addition to the aforementioned configuration, the remote control further comprising a screen information acquisition unit for acquiring screen information from the display, wherein the icon arrangement information acquisition unit comprises means for screen analysis for acquiring icon arrangement information based on the acquired screen information is provided. Moreover, a display apparatus and a television receiver comprising the remote control configured as described above are provided.

Additionally, a program for controlling of such remote control is provided. Specifically, a program for a remote control provided with a function for icon selection on a GUI of a display apparatus and provided with a touchpad including touch sensors is provided. Such program causes a computer to execute the steps of acquiring icon arrangement information on the GUI screen, outputting distinction for touching guidance of the touch sensor on the touchpad corresponding to the icon arrangement information on the GUI, and outputting a selection signal specifying the icon of the corresponding GUI resulting from touching of the touch sensor on the touchpad performed based on the distinction.

Effects of the Invention

In accordance with the present invention having the above configuration, for a remote control that selects icons on a GUI as a target of operations using a touch sensor, it is possible for users to easily understand the relationship of correspondence between arrangement positions of icons on GUIs and positions on a touchpad of a touch sensor. Thereby, operational errors due to differences in touch positions can be reduced. Moreover, it becomes possible to establish the relevant configuration without using a touch panel equipped with an information display function. Thus, costs for remote control components as well as power consumption can remain low.

BRIEF DESCRIPTION OF THE DRAWINGS

FIG. 1 is a diagram showing an example of operational inputs for a remote control of the first embodiment.

FIG. 2 is a functional block diagram of a remote control of the first embodiment.

FIG. 4 is a diagram showing an example of table data used to acquire icon arrangement information from a remote control of the first embodiment.

FIG. 5 is a diagram showing an example of distinction outputs of a remote control of the first embodiment.

FIG. 9 is a functional block diagram of a remote control of the second embodiment.

FIG. 10 is a conceptual diagram showing an example of depth perception for touchpad distinction of a remote control of the second embodiment.

FIG. 12 is a conceptual diagram showing an example of icon arrangement information acquisition of a remote control of the third embodiment.

FIG. 15 is a diagram showing an example of an output form for distinction outputted to a touchpad of a remote control of the fourth embodiment.

FIG. 17 is a diagram showing an example of another output form for distinction outputted to the touchpad of a remote control of the fourth embodiment.

DETAILED DESCRIPTION OF THE INVENTION

Figure 3:
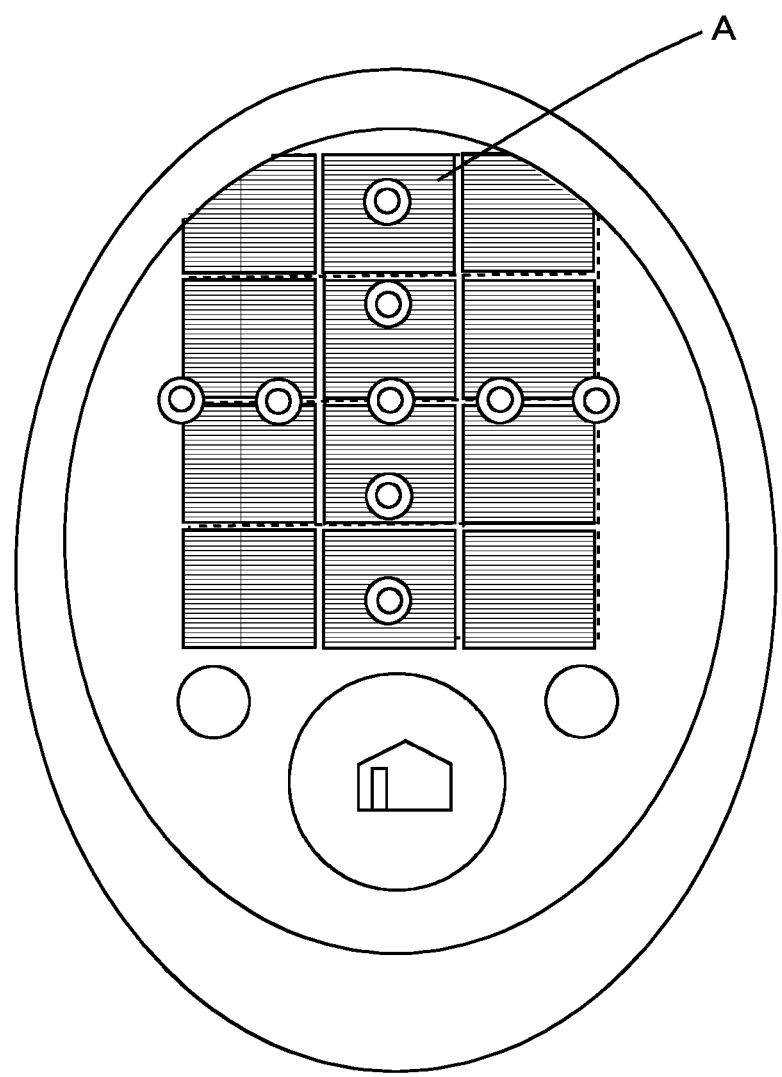
FIG. 3 is a diagram showing an example of a touchpad of a remote control of the first embodiment.

Embodiments of the present invention will be described hereinafter with reference to the drawings. The present invention is not to be limited to the above embodiments and able to be embodied in various forms without departing from the scope thereof. The first embodiment will mainly describe Claims 1, 5, 6, and 7. The second embodiment will mainly describe Claim 2. The third embodiment will mainly describe Claim 3. The fourth embodiment will mainly describe Claim 4.

First Embodiment

Outline of First Embodiment

FIG. 1 is a diagram showing an example of operational inputs of a remote control of the first embodiment. As shown in FIG. 1($a$), for example, in order to confirm whether or not a program that has been selected from a recording list is deleted, a GUI in which selection items for "Yes" and "No" are arranged next to each other is shown on a display of a television receiver as a target of operation for such remote control. As shown in FIG. 1($b$), in accordance with the aforementioned GUI, the remote control of the present embodiment is configured in order for a touch sensor γ1 in the left area of β on a touchpad and a touch sensor γ2 in the right area of β thereon to light up, respectively.

As described above, in order to select "Yes" or "No" allocated on the GUI, a user can easily identify what position on a touchpad of the remote control such user should touch. Thereby, operational errors can be reduced.

Functional Configuration of First Embodiment

FIG. 2 is a functional block diagram of a remote control of the present embodiment. Note that, the functional block of the remote control in question described below and an operation system using the remote control can be implemented by hardware, software, or both hardware and software. Specifically, in the case of using a computer, the respective units are implemented by the hardware configured by a CPU, a main memory, a bus, a secondary storage device (e.g., a hard disk or a nonvolatile memory, a storage media such as CD or DVD, or a reading drive for the above media), an input device for inputting information, a display apparatus, a printing device, and other peripheral devices, and an interface for the other peripheral devices, a communication interface, and a driver program for controlling the above hardware, other application programs, and application for user interface.

Subsequently, the CPU executes operation in accordance with the program loaded into the main memory, so that processing, storing and outputting of the data, inputted through the input device or the interface etc. and stored in the memory of the hard disk, are carried out, and instructions to control the hardware and software described above are generated. Alternatively, the respective functional blocks of the remote control in question may be implemented by specialized hardware.

Moreover, the present invention can be implemented not only as a remote control but also as a method thereof. Moreover, a portion of such inventions may be configured as software. Furthermore, a software product (program for remote control) used for causing a computer to execute the software, and the recording medium, in which the software is installed, should be included in the technical scope of the present invention as a matter of course (the same applies throughout the entire specification).

Additionally, the term "remote control" of the present embodiment refers to a remote control equipped with an icon selection function on a GUI of a display apparatus. In addition, a target of operations for the remote control of the present embodiment is not limited to a display apparatus equipped with a display or a television receiver equipped with a receiving and display function for TV broadcasting. Other electric devices are acceptable, such as a recording and reproducing apparatus connected to a display apparatus or a microwave with a display into which a display apparatus has built, etc.

The term "GUI" refers to a screen for GUI (Graphical User Interface) that displays selectable item icons on its display, which indicate the nature of operation. A user can visually understand the nature of the relevant operation by selecting selection items displayed on the GUI and can implement such operation. The term "icon selection function" refers to a function for selecting icons representing selection items displayed on the GUI. In addition, icons represented in character strings as well as graphics, symbols, and pictures are included.

As shown in FIG. 2, a "remote control (0200)" of the present embodiment comprises a "touchpad (0201)", an "icon arrangement information acquisition unit (0202), a "distinction output unit (0203)," and a "selection output unit (0204).

A "touchpad (0201)" is configured to be equipped with a touch sensor. The term "touch sensor" refers to a sensor that detects contacts using fingers and/or stylus pens. Examples of the form of detection thereof include resistive film type, capacitance type, electromagnetic induction type, infrared sensor type, surface elastic wave type, and image recognition type. The touch sensor included in touchpad may be configured based on arrangement of a plurality of physical detector elements. In the case of reading by the light shielding or image recognition, it is possible to provide a plurality of virtual detector elements read by identifying its coordination according to the reading method. Additionally, the detection scope (including virtual scope) of such touch sensor may be configured by one detector element or by a group comprising a plurality of detector elements.

FIG. 3 is a diagram showing an example of the aforementioned touchpad. As shown in such figure, for example, a plurality of touch sensors are arranged in a matrix (in a square area indicated by horizontal lines) on the touchpad. When a user touches the touch sensor A with his or her finger or using a stylus pen etc., the coordinate information for the same is acquired and the tapping action on the position is read. Moreover, as shown in this figure, a light-emitting body, such as a LED (Light-Emitting Diode), may be embedded and arranged near the touch sensor for "distinction for touching guidance" described below.

The "icon arrangement information acquisition unit (0202)" has a function for acquiring icon arrangement information on the aforementioned GUI of the display apparatus. For instance, such unit can be implemented by a calculator, a communication circuit, or a program for acquiring icon arrangement information, etc. In addition, various specific pieces of icon arrangement information described above that indicate icon arrangement positions on the GUI can be used. For instance, icon arrangement information may be icon position information (i.e., coordinate information) on a GUI. Alternatively, it is acceptable to divide the detection area of the touchpad into areas such as upper-right area, upper-left area, lower-right area, or lower-left area, etc., and to store table information as shown in FIG. 4(a), where distinction information of the respective areas and position information included in such areas are correlated. Therefore, it is acceptable to acquire the area distinction information as the icon arrangement information, thereby identifying the icon position information with reference to the aforementioned table.

Moreover, it is possible to indicate icon positions based on GUI distinction information (e.g., a recording list) as a relevant target of operation. For instance, in the case of a "recording list," a 3×2 thumbnail image (icon) display may be specified, and in the case of a choice between two selection screens, a right-and-left icon display may be specified. Here, as shown in FIG. 4(b), it is possible to preliminarily store the table information, where the GUI distinction information and position information for icons used for the operation related to the GUI distinction information are correlated. The GUI distinction information may be acquired as icon arrangement information, thereby identifying arrangement information with reference to the aforementioned table.

In regards to the method for acquisition of icon arrangement information described above, for instance, it is possible to acquire such information by receiving icon arrangement information transmitted from a display apparatus. Alternatively, in case that it is possible to identify icon position information based on the GUI distinction information described above, it is acceptable to acquire icon arrangement information through acquisition of the relevant GUI distinction information based on input reception of a "recording list button" established on a remote control or shown on a touch sensor of the present embodiment so as to display the GUI of the recording list.

Additionally, as described in the third embodiment below, it is also possible to specify a method for acquisition of icon arrangement positions, such as through analyzing of a GUI itself shown on a display using an illuminance sensor and a camera for image recognition, etc.

The "distinction output unit (0203)" has a function to output distinction for touching guidance for a touch sensor on a touchpad corresponding to icon arrangement on the GUI on the touchpad based on the acquired icon arrangement information. Such unit can be implemented by a calculator, a distinction output program, and various mechanisms (e.g., emission mechanism, etc.) for distinction. Specifically, the following form of processing is executed through such distinction output unit. That is to say, the touchpad coordinate information corresponding to icon display coordinates on a GUI specified through icon arrangement information is calculated using a table in which the icon display coordinates on the GUI correspond to the touchpad coordinates and mapping function, etc. Instructions for outputting for distinction, such as luminance, etc., are given to a touch sensor arranged at a touchpad coordinate position determined through the calculation.

FIG. 5 is a diagram explaining an example of distinction outputs. As shown in FIG. 5 (a), for instance, selection items of "Yes" and "No" are arranged next to each other on the GUI. In such case, the right-and-left area (shaded area) based on the icon arrangement on the screen on the touchpad of the remote control is configured to become luminous. Alternatively, as shown in FIG. 5 (b), selection items for various functions are arranged approximately from side to side and from top to bottom on the GUI. In such case, an area (shaded area) in line with four sides on the touchpad of the remote control is configured to become luminous.

The aforementioned explanation was made using the example of "optical outputs" for distinction for touching guidance. However, touch sensor configurations therefor are not particularly limited. For instance, as shown in FIG. 3, it is possible to create holes in individual touch sensors and to embed light-emitting bodies therein, such as LEDs (Light-Emitting Diodes), allowing touch sensors (in the vicinity) to become luminous. Alternatively, examples of a configuration in which a touch sensor itself emits light or a laminated structure in which a light-emitting body lies underneath a touch sensor made of transparent materials are also possible.

Additionally, the outputs for distinction described above are not limited to optical outputs. For instance, touch sensors have mechanisms that allow convex and concave configurations, thus allowing touch sensors in locations corresponding to icons on a GUI to be raised upwards (or, to the contrary, to allow touch sensors other than those in locations corresponding to icons on a GUI to be lowered downward). Thereby, outputs are possible for potential distinction for touching guidance. Alternatively, it is also possible to consider the following method. That is to say, a touch sensor is configured to be composed of controllable materials so that such touch sensor can be changed from a hardened state to a softened state, and a touch sensor in a location corresponding to an icon on a GUI becomes hardened, thereby allowing outputs in an identifiable manner for touching guidance.

Moreover, a user can easily understand the relationships among icons on the GUI and distinction outputs on the touchpad. As long as such prerequisite conditions are satisfied, it is acceptable for the arrangement of coordinates, shapes, and sizes of icons on the GUI to not necessarily and completely match, and the same is applicable to arrangement coordinates, shapes, and sizes of output coordinates for distinction on the touchpad. For instance, as shown in FIG. 5, when oval-shaped selection icons for "Yes" and "No" are arranged next to each other on a GUI, it is acceptable for distinction outputs on a touchpad to be outputted in a larger manner than is possible with square-shaped icons of a GUI.

The "selection output unit (0204)" has a function for outputting a selection signal for the corresponding GUI icon by touching of the touch sensor on the touchpad performed based on distinction. For instance, such unit can be implemented by a calculator, a selection output program, and an output circuit related to a selection signal, etc. Specifically, by reference to distinction outputs on the touchpad, a user comes into contact with locations on the touchpad corresponding to desired operations, using fingers, stylus pens, or indicators similar thereto. In such cases, it is possible for coordinate information of a touch sensor that has detected touching to be outputted from a signal output circuit of a remote control. The nature of operation for an icon corresponding to a relevant position is interpreted on the side of the target of operation. Alternatively, if it is possible for such interpretation program to be executed through a remote control, it is acceptable to specify the operations in a location in which the relevant touching has been detected (e.g., an operation indicating "Yes") and to output an operational signal indicating the operation from the signal output circuit to the target of operation.

As described above, in regards to a remote control that selects an icon on a GUI as a target of operation using a touch sensor, a user can easily understand the relationship of correspondence between icon arrangement positions on the GUI and locations on the touchpad of the touch sensor, and can perform relevant operations.

Functional Configuration of Display Apparatus

Figure 6:
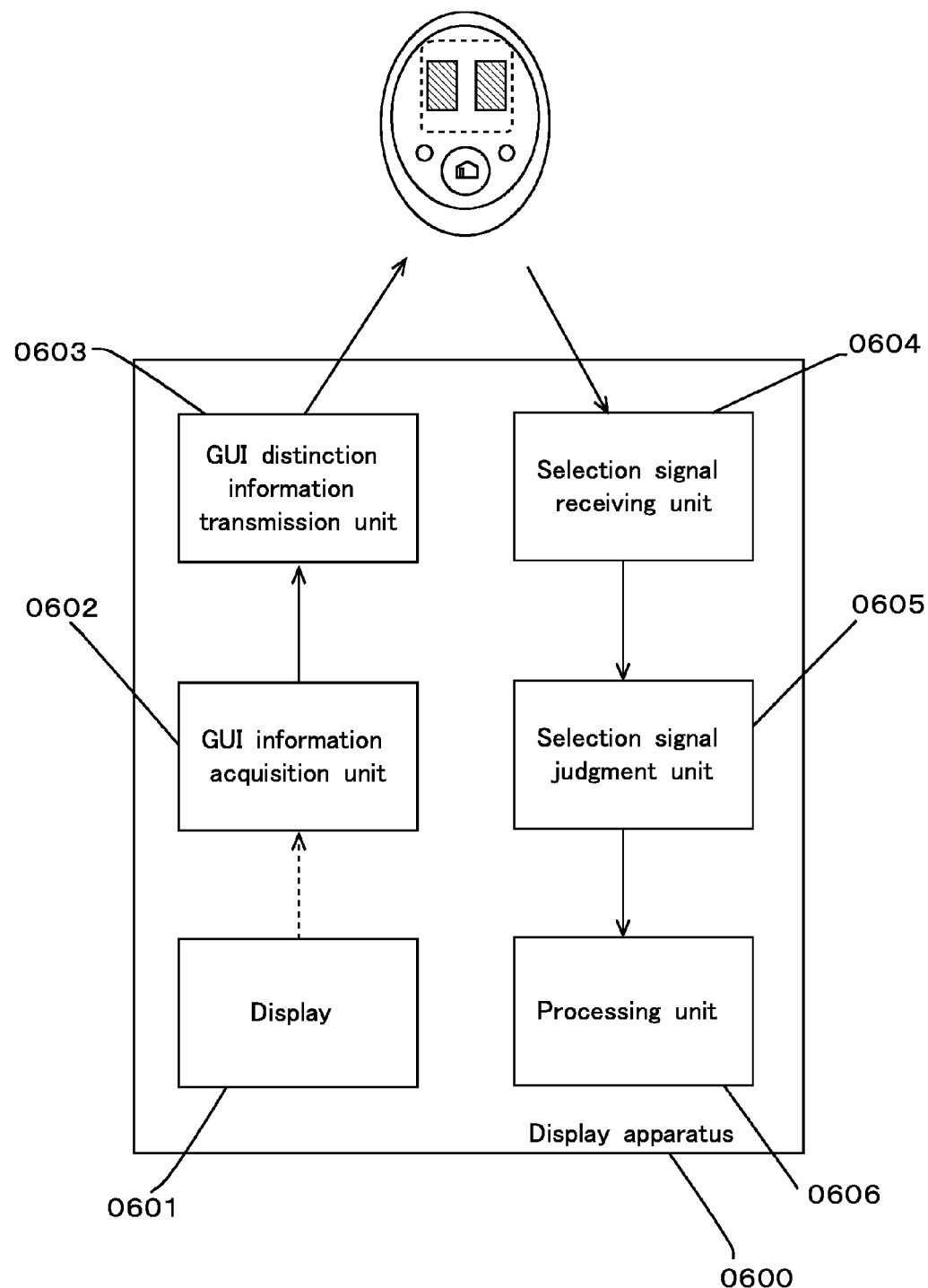
FIG. 6 is a functional block diagram for a display apparatus used for a remote control of the first embodiment.

In addition, as described above, it may also be possible for icon arrangement information to be outputted from the display apparatus used for the remote control of the present embodiment and for an operation of a selection signal outputted from the remote control to be interpreted on the side of the display apparatus. Therefore, using FIG. 6, an example of functional configuration of such display apparatus is explained. As shown in such Fig., a "display apparatus (0600)" comprises a "display (0601)," an "GUI information acquisition unit (0602)," a "GUI distinction information transmission unit (0603)," a "selection signal receiving unit (0604)," a "selection signal judgment unit (0605)," and a "processing unit (0606)."

The "display (0601)" has a function for displaying a GUI and its display form is not limited. For instance, examples thereof include a liquid-crystal display, a plasma display, an organic EL display, and a cathode ray tube display.

The "GUI information acquisition unit (0602)" has a function for acquisition of GUI information for display and operation reception of a GUI to be shown on a display. For instance, such unit can be implemented by a calculator and a GUI information acquisition program, etc. Specifically, in the case of reception of an operational signal indicating predetermined display instructions for a GUI from a remote control, GUI information related to a GUI indicated by such signal is acquired. Moreover, in the case of screen change accompanying the change of an operation, the GUI information for GUI to be indicated next, which is specified in accordance with the relevant change rules, is obtained.

Additionally, based on the GUI information acquired as described above, a GUI on which icons indicating relevant operations on a display have been allocated in a selectable manner may be displayed, and it is possible to accept operational inputs.

The "GUI distinction information transmission unit (0603)" has a function for acquisition of GUI distinction information and transmission of the same to a remote control. For instance, such unit can be implemented by a calculator, a program for acquisition of GUI distinction information, and a signal output circuit, etc. Moreover, the expression "GUI distinction information" refers to information for distinction of a GUI currently indicated on a display. For instance, for a channel selection screen, "ID:A" is acceptable. For a channel selection screen for Yes/No, "ID:B" is acceptable. Alternatively, it is acceptable to transmit area distinction information concerning an area when the GUI is divided based on a prescribed area or it is acceptable to transmit coordinate information regarding an icon allocated in such GUI as GUI distinction information. In regards to acquisition of the GUI distinction information, it would be ideal to acquire GUI distinction information that identifies GUI acquired via the GUI information acquisition unit described above. Moreover, as described above, in case that a unit has been configured to allow acquisition of GUI distinction information based on operational inputs via a remote control itself (such as by pushing a recording list button, etc.), such GUI distinction information transmission unit may be omitted.

The "selection signal receiving unit (0604)" has a function for reception of a selection signal outputted from the selection output unit of the remote control. For example, in case that a selection signal is outputted by the remote control using infrared light, such unit can be implemented by an infrared light-emitting device. In case that a selection signal is outputted by the remote control in another form, such unit can be implemented by a receiving circuit.

The "selection signal judgment unit (0605)" has a function for judgment of information about operation shown via a selection signal received by the selection signal receiving unit. For example, such unit can be implemented by a calculator and a selection signal judgment program, etc. In case that icon coordinate information has been indicated via a selection signal, by reference to GUI information, information about operation shown by such icon in the relevant location based on such information is judged. Alternatively, the selection signal judgment unit may include remote control codes. A calculator acquires information about operation shown via a selection signal by reference to such remote control codes.

The "processing unit (0606)" has a function for execution of processing based on the information about operation judged by the selection signal judgment unit. For instance, such unit can be implemented by a calculator and a processing program, and each hardware configuration and a control program based on the information of operation.

Hardware Configuration

Figure 7:
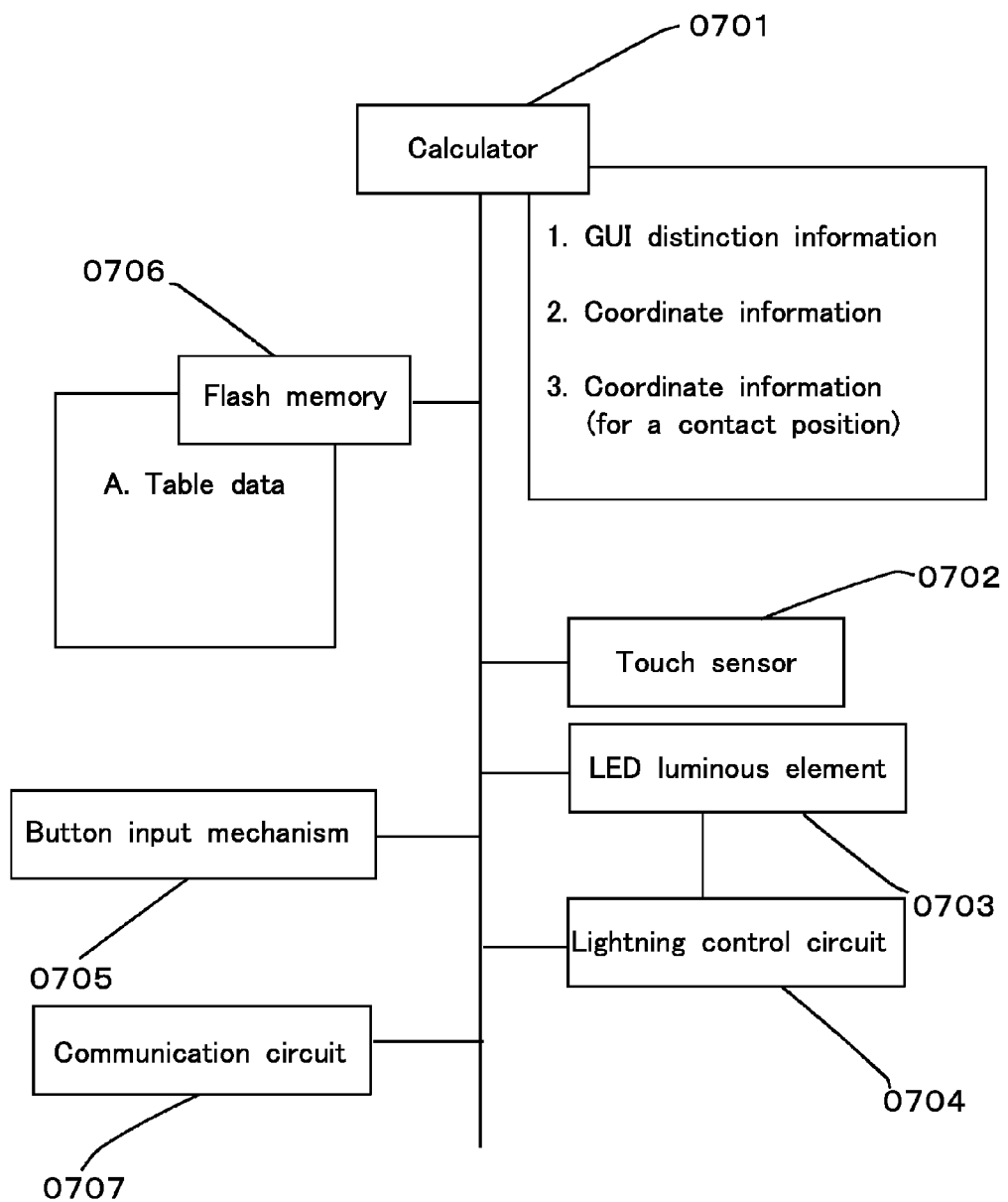
FIG. 7 is a diagram showing an example of hardware configuration of a remote control of the first embodiment.

FIG. 7 is a schematic diagram showing an example of configuration of a remote control of the present embodiment when the functional constituent features described above are implemented as hardware. Operations for hardware configuration units for distinction output processing of a touchpad are explained using such figure.

As shown in this figure, the remote control of the present embodiment comprises the "calculator (0701)." Such calculator is an icon arrangement information acquisition unit and is hardware configuration that executes other various calculations. Moreover, for the purpose of operation, the calculator may include a primary memory for operation or may separately have an external memory. Additionally, a "touch sensor (0702)," which is included in a touchpad, an "LED luminous element (0703)" as a distinction output unit in the vicinity thereof, and a "lightning control circuit (0704)" are individually established. In addition, for instance, in lieu of the configuration mentioned above, the distinction output unit may be composed of a "convex mechanism" and its "convex control circuit" or a "hardening mechanism" and its "hardening control circuit," which are not shown in figures.

Additionally, the remote control of the present embodiment also comprises a "button input mechanism (0705)," a "flash memory' (0706)" for storing table data, etc., in which GUI distinction information and coordinate information of a touch sensor are correlated, and a "communication circuit (0707)" as a selection output unit. Alternatively, in lieu thereof, other communication mechanisms, such as an "infrared light-emitting device," may be used. Such mechanisms are mutually connected through the data communication path, such as a "system bus," thereby carrying out transmission/reception and processing of the information.

And the programs are loaded into the "primary memory", and the "calculator" refers to the loaded program and executes the various calculations in accordance with the procedures indicated through the program. Moreover, a plurality of addresses are assigned to the "primary memory" and the "flash memory," and in the calculation by the "calculator," address specification and access to the stored data are carried out, thereby executing the calculation by utilizing the data.

Here, for instance, in order for a user to edit a recording list, the user performs operational inputs that cause the recording list to be displayed on a display apparatus to which a recorder is connected (or built into) using a "touch sensor" or a "button input mechanism." Then, the "calculator" interprets a program for acquiring of icon arrangement information, acquires GUI distinction information indicating performance of operation using a recording list shown based on the relevant operational inputs in accordance with interpretation of the program for acquiring of icon arrangement information, and stores such information at address 1 in the primary memory built in the calculator.

Alternatively, for instance, when displaying the reception screen of the operational input using the electronic recording list, the GUI distinction information may be outputted from the recorder as a target for operation, may be received by the "wireless communication circuit" of the remote control, and may be stored at address 1 in the primary memory. Moreover, when the table as shown in FIGS. 4 (*a*) and (*b*) is stored in the flash memory in the recorder, in lieu of the GUI distinction information, information indicating the area of the touchpad or coordinate information concerning a touch sensor may be transmitted directly from the recorder, and such received information may be stored at address 1 in the primary memory as icon arrangement information.

And when information stored in the primary memory is GUI distinction information or information indicating an area information of the touchpad, with reference to the tables of FIGS. 4 (*a*) and (*b*), stored in the "flash memory," coordinate information of the touch sensor correlated in the table is specified, and such specified information is stored at address 2 of the primary memory.

Subsequently, the "calculator" interprets the distinction output program and outputs instructions for light-emitting (or turning lights off) and instructions for blinking to the "lightning control circuit" in the vicinity of a touch sensor specified based on the coordinate information stored at address 2 in the primary memory. Then, the lightning control circuit executes control that causes the "LED luminous element" controlled by such circuit to emit light, to blink, or to emit light of a different color from that in surrounding areas, etc. Thereby, for instance, a touch sensor specified by coordinate information is outputted in "3×2" in an identifiable manner based on a "3×2" thumbnail list for a GUI.

Subsequently, the "calculator" interprets a selection output program and awaits input via touch operation. Additionally, in case that a GUI change takes place during such period, the "calculator" acquires the GUI distinction information displayed next based on the change, etc., thereby causing light-emitting control based on the GUI presently shown on the display. In case that contact with a touch sensor involving distinction outputs has been detected, the coordinate information of the corresponding touch sensor is acquired from the detection signal and such coordination information is stored at address 3 in the primary memory.

Such coordinate information is outputted to a recorder as a target of operation, for instance, from the "wireless communication circuit." Alternatively, in case that a selection signal judgment program including a remote control code has been stored in the "flash memory" of the remote control, the "calculator" interprets such program and specifies the content of operation indicated through the coordinate information. The operational signal indicating the nature of the operation is outputted to a recorder as a target of operation from the "wireless communication circuit," for instance.

Processing Flow of First Embodiment

Figure 8:
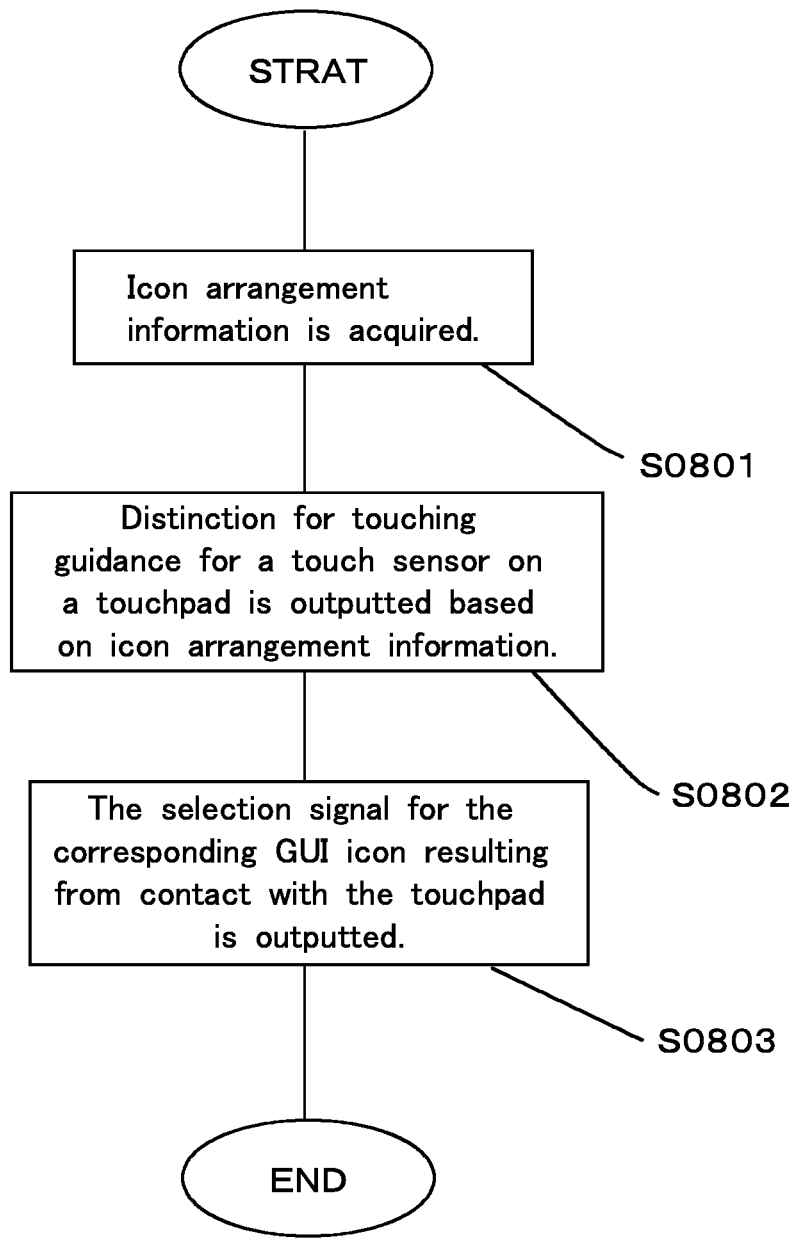
FIG. 8 is a flowchart showing processes applicable to a remote control of the first embodiment.

FIG. 8 is a flowchart showing processes for the remote control of the present embodiment. Note that, the following steps may be executed by the respective hardware configurations of the computer as above, or may configure a program, which is stored in a medium and is for controlling the computer. Additionally, the remote control has a function for selection of icons on a GUI of a display in a display apparatus and has a touchpad equipped with a touch sensor.

As shown in FIG. 8, icon arrangement information on the GUI of the display apparatus is acquired (step S0801). In addition, it may be ideal to acquire such icon arrangement information in various forms. For instance, as explained in the above paragraph on the icon arrangement information acquisition unit, it is acceptable to acquire GUI distinction information inputted based on operation of the remote control, to refer to the table shown in FIG. 4 using such information, and to acquire icon arrangement coordinates. Moreover, it is acceptable to acquire GUI distinction information and information indicating a corresponding area on a touchpad or to acquire touch sensor coordinate information directly from the electric device as a target of operation of this remote control.

Then, distinction for touching guidance for the touch sensor on the touchpad corresponding to the icon arrangement on the GUI described above (e.g., distinction through light emitted in the vicinity of the touch sensor, etc.) is outputted to the touchpad based on the acquired icon arrangement information (step S0802). The selection signal for the corresponding GUI icon resulting from contact with the touch sensor on the touchpad based on the distinction is outputted (step S0803).

Brief Description of Effects of First Embodiment

As described above, according to the remote control of the present embodiment, in regards to the remote control that selects icons on a GUI as a target of operation using a touch sensor, a user can easily understand the relationship of correspondence between the arrangement positions of icons on the GUI and the position on the touchpad of the touch sensor. Therefore, it is possible to reduce operational errors due to different touching positions. Moreover, it is possible to make relevant configuration without using a touch panel equipped with an information display function. Thus, costs for remote control components as well as power consumption can remain low.

Second Embodiment

Outline of Second Embodiment

In the second embodiment, on the basis of the first embodiment described above, in case that arrangement of icons for a GUI is based on depth perception (quasi-three dimensional display), such as superimposition of icons, etc., a remote control is characterized by touchpad distinction outputs based on such depth perception arrangement.

Functional Configuration of Second Embodiment

FIG. 9 is a functional block diagram of a remote control of the present embodiment. As show in FIG. 9, on the basis of the first embodiment, a "remote control (0900)" of the present embodiment comprises a "touchpad (0901)," an "icon arrangement information acquisition unit (0902)," a "distinction output unit (0903)," and a "selection output unit (0904)." The remote control of the present embodiment is characterized by the fact that the icon arrangement information acquisition unit further comprises "means for acquiring depth position information (0905)," and by the fact that the distinction output unit further comprises "means for depth distinction output (0906)."

"Means for acquiring depth position information (0905)" has a function for acquisition of depth position information. Additionally, the term "depth position information" refers to information indicating positions of a plurality of icons arranged to give the impression of depth using such icons on a screen. In addition, the depth position information acquired here may contain information indicating icon arrangement coordinates as well as distinction information indicating that such icons are arranged in depth positions. In regards to the remote control, a calculator judges whether or not there exists distinction information indicating such depth positions. In case that there exists such information, the acquired icon arrangement information is processed as depth position information. Alternatively, the calculator judges whether or not icons are superimposed using information regarding matters such as coordinates, sizes, and shapes of icons shown through the acquired icon arrangement information. In case that such icons are superimposed, the acquired icon arrangement information may be processed as depth position information.

"Means for depth distinction output (0906)" has a function for arrangement of the illusion of depth for the distinction output on a touchpad based on the acquired depth position information. FIG. 10 is a conceptual diagram showing an example of depth perception for such distinction output. As shown in FIG. 10 (*a*), for instance, it is possible to use a pattern for distinction display on a touchpad in the same manner as that used for icon superimposition display on a GUI. Alternatively, as shown in FIG. 10 (*b*), the largest frame may be outputted for the nearest icon for superimposition and the smallest frame is outputted for the aftermost icon. And the frames corresponding to each icon are displayed without superimposition thereof, like annual rings on a tree stump. Based on the pattern, depth perception can be arranged so that depth can be identified.

As such, it is possible to output, in an identifiable manner, touch sensor positions corresponding to icons on a GUI in a quasi-three dimensional depth position form. Therefore, even when icon depth perception is implemented, it is possible to reduce operational errors due to different touching positions.

Processing Flow of Second Embodiment

Figure 11:
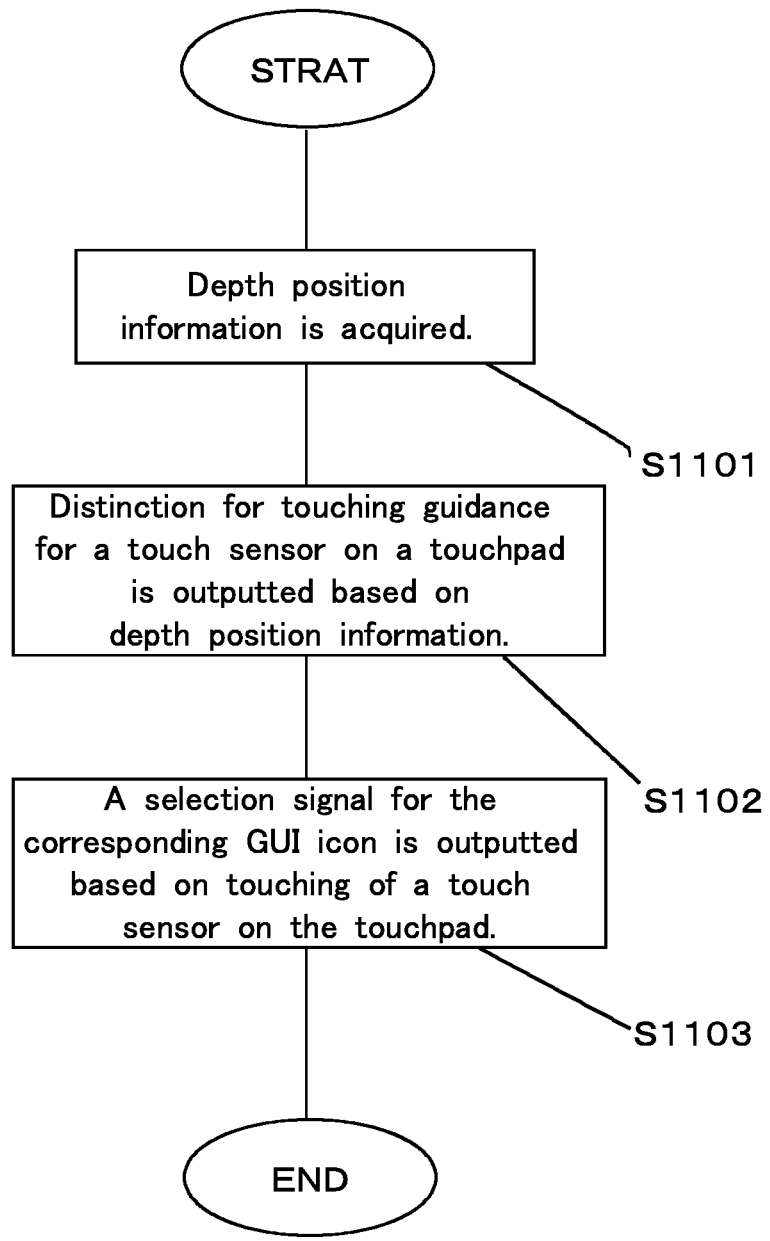
FIG. 11 is a flowchart showing processes applicable to a remote control of the second embodiment.

FIG. 11 is a flowchart showing processes in the remote control of the present embodiment. Note that, the following steps may be executed by the respective hardware configurations of the computer as above, or may configure a program, which is stored in a medium and is for controlling the computer. As shown in FIG. 11, the depth position information is acquired as icon arrangement information on the GUI of the display apparatus (step S1101). In addition, as described above, it may be ideal to perform processing of judgment as to whether or not relevant information is depth position information or icon arrangement information other than the aforementioned depth position information based on distinction information and superimposition judgment processing. In case that the acquired position information is depth position information, distinction for touching guidance for a touch sensor on a touchpad corresponding to the icon arrangement on the GUI (e.g., distinction through luminance in the vicinity of a touch sensor, etc.) is outputted so that depth perception can be implemented on the touchpad based on the acquired depth position information (step S1102). The selection signal regarding the corresponding GUI icon is outputted based on touching the touch sensor on the touchpad, which is performed in accordance with the distinction described above (step S1103).

Brief Description of Effects of Second Embodiment

As described above, according to the remote control of the present embodiment, in response to an icon on a GUI which is included in a depth position in a quasi-three dimensional manner, the position of such icon on a touch sensor may be outputted in an identifiable manner. Therefore, even when icon depth perception is implemented, it is possible to reduce operational errors due to different touching positions.

Third Embodiment

Outline of Third Embodiment

In relation to acquisition of the icon arrangement information for the aforementioned embodiment, a remote control of the present embodiment is characterized by specifying a GUI indicated on a display using image recognition or an illuminance sensor, etc. and acquiring such information using such specification. FIG. 12 is a conceptual diagram showing an example of icon arrangement information acquisition of a remote control of the present embodiment. As shown in FIG. 12 (a), for instance, a GUI in which icons for "Yes" and "No" as selection items are displayed is shown on a screen. Then, the remote control of the present embodiment uses image recognition processing and sensor results from an illuminance sensor and identifies that two icons are allocated next to each other on the GUI. As shown in FIG. 12 (b), using such information, it is possible to identify relevant positions by brightening the touch sensors γ1 and γ2 in the corresponding areas on a touchpad.

Functional Configuration of Third Embodiment

Figure 13:
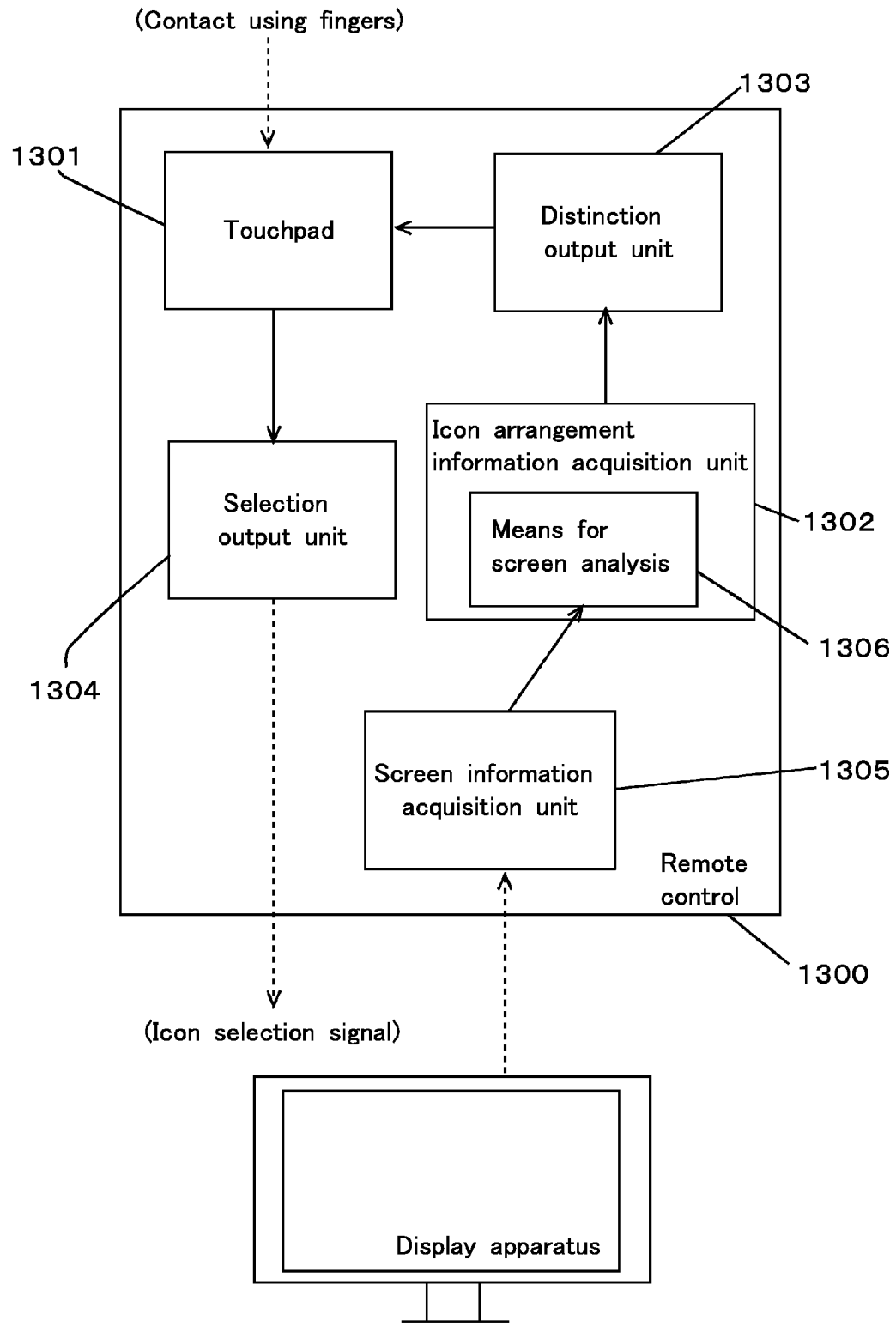
FIG. 13 is a functional block diagram of a remote control of the third embodiment.

FIG. 13 is a functional block diagram of a remote control of the present embodiment. As shown in this figure, on the basis of the first embodiment, a "remote control (1300)" of the present embodiment comprises a "touchpad (1301)," an "icon arrangement information acquisition unit (1302)," a "distinction output unit (1303)," and a "selection output unit (1304)." Additionally, on the basis of the remote control of the second embodiment, "means for acquiring depth position information" or "means for depth distinction output" not shown in the figure may be included. The remote control of the present embodiment is characterized by comprising a "screen information acquisition unit (1305)" and is characterized by the fact that the icon arrangement information acquisition unit comprises "means for screen analysis (1306)."

The "screen information acquisition unit (1305)" has a function for acquisition of screen information from a display apparatus. The term "screen information" refers to information related to a GUI shown on a display, and in particular, such information allows identification of icon display positions on the GUI operated by a remote control. For instance, methods for acquiring such screen information include a method for acquiring screen imaging data by camera when a remote control comprises such a camera. Alternatively, a remote control may comprise an illuminance sensor, may measure screen illuminance, and may acquire the resulting measured value as screen information.

"Means for screen analysis (1306)" has a function for acquiring icon arrangement information based on the acquired screen information. Specifically, for instance, in case that an image for screen information is taken by a camera, an image recognition program is referred to, and whether or not there exists an item that matches a typical icon image or a frame image that has been stored in advance through calculation by a calculator is judged. The item within the image that is deemed to be matched is considered to be an icon, and coordinate information for the same is acquired. Alternatively, icons are exclusively indicated using light that is brighter than that of the background. Thus, distribution of illuminance by an illuminance sensor is judged through calculation by a calculator. A bright area established based on a difference between such area, which is illuminated to or above a degree defined by a threshold value, and an adjacent location is identified. Coordinate information is acquired based on the fact that such area is considered to be an icon.

As described above, according to the present embodiment, for instance, it is possible to acquire screen information through image recognition processing and illuminance detection processing by an illuminance sensor. Based on such information, the coordinate information for an icon on a GUI can be obtained as icon arrangement information.

Processing Flow of Third Embodiment

Figure 14:
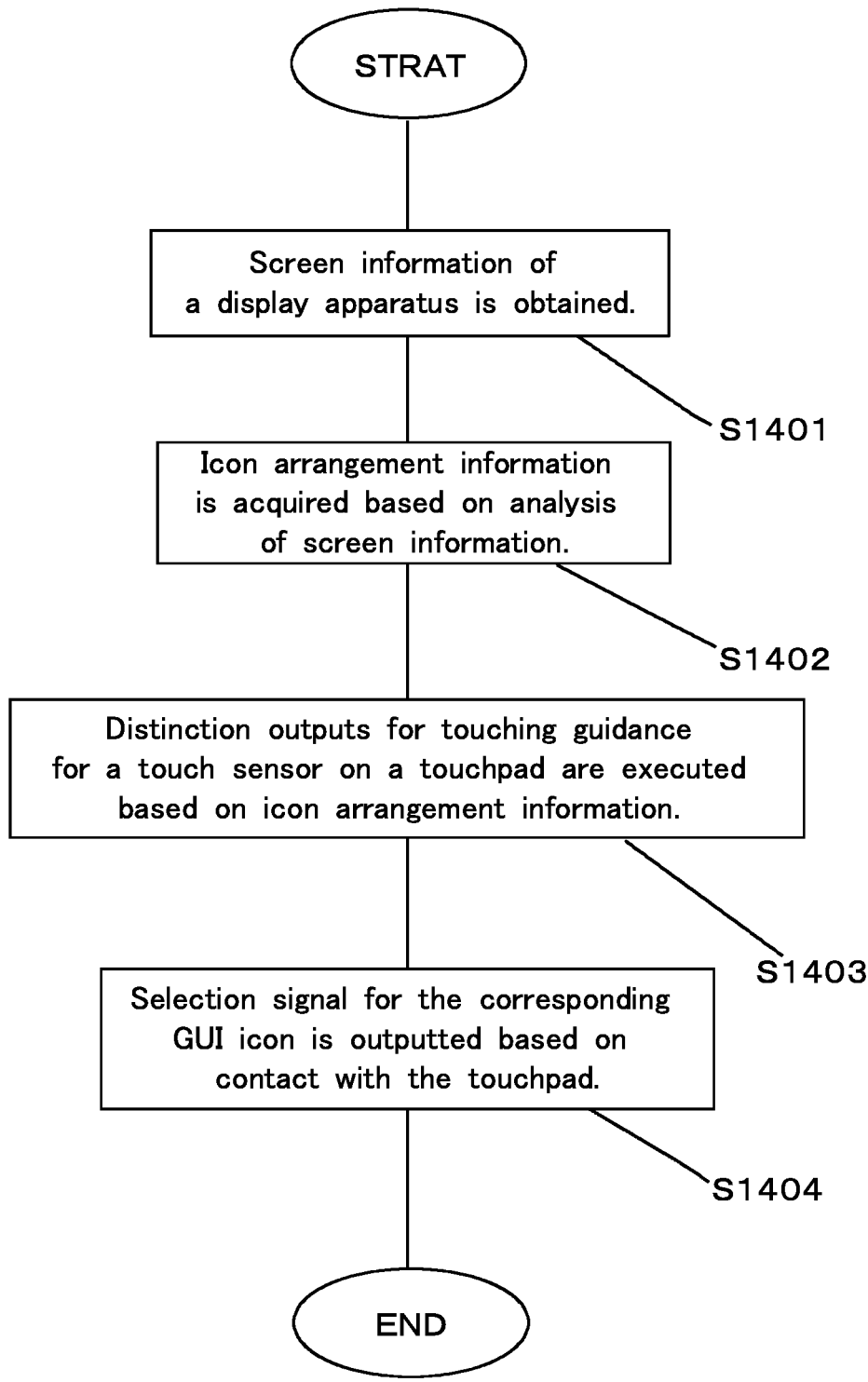
FIG. 14 is a flowchart showing processes applicable to a remote control of the third embodiment.

FIG. 14 is a flowchart showing processes in a remote control of the present embodiment. Note that, the following steps may be executed by the respective hardware configurations of the computer as above, or may configure a program, which is stored in a medium and is for controlling the computer. As described in this figure, first, for instance, screen information of a display apparatus is obtained through image recognition processing and illuminance detection processing by an illuminance sensor (step S1401). Subsequently, in regards to such screen information, image analysis and distribution analysis are performed through calculation by a calculator, and based on the results of such analyses, icon arrangement information is acquired (step S1402). Successively, based on the icon arrangement information acquired as above, distinction outputs for touching guidance for a touch sensor on a touchpad corresponding to icon arrangement on a GUI are executed (step S1403). Finally, a selection signal for the corresponding GUI icon is outputted based on contact with the touch sensor on the touchpad, and this process is performed based on the distinction outputs described above (step S1404).

Brief Description of Effects of Third Embodiment

As described above, according to the remote control of the present embodiment, for instance, it is possible to acquire screen information through image recognition processing and illuminance detection processing using an illuminance sensor. Based on such information, icon arrangement information can be obtained.

Fourth Embodiment

Outline of Fourth Embodiment

FIG. 15 is a diagram showing an example of an output form for distinction (i.e., distinction indicating an area on a touchpad corresponding to an icon arrangement on a GUI of a display apparatus) outputted to a touchpad of a remote control of the present embodiment. As shown in FIG. 5 (a), in the remote control of the present embodiment, distinction γ1 and γ2 are outputted via LED luminescence on a touchpad of the remote control based on an icon arrangement on a GUI of a display. When a user intends to select "Yes" on the GUI and touches the left area of the touchpad, the remote control that has detected such touching outputs distinction γ1 to the left, enlarges the relevant icon, and outputs distinction γ2 to the right that reduces the size of the relevant icon, as shown in FIG. 15 (b).

As described above, the remote control of the present embodiment is characterized by the fact that outputting of distinction based on touching by a user can be easily understood.

Functional Configuration of Fourth Embodiment

Figure 16:
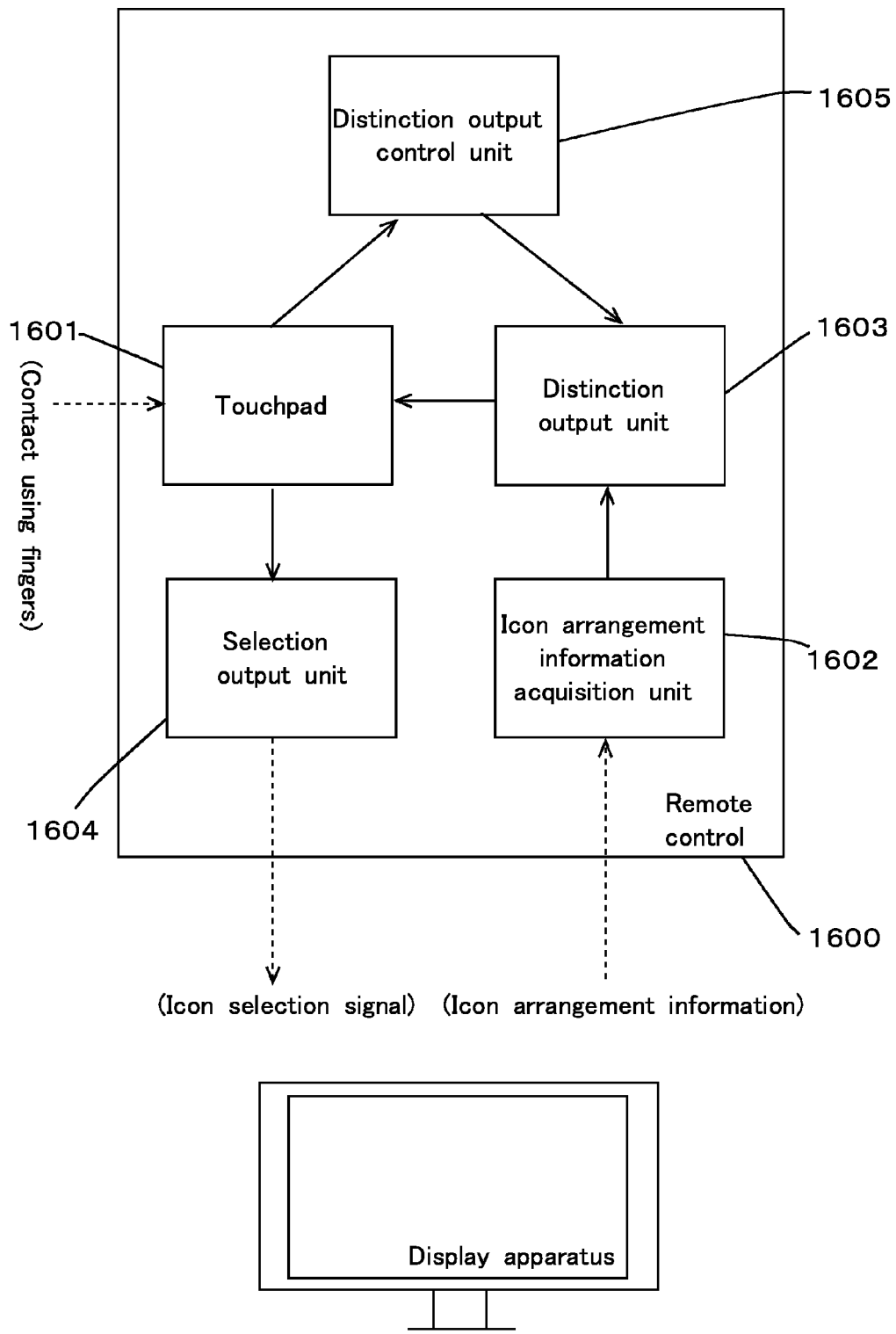
FIG. 16 is a functional block diagram of a remote control of the fourth embodiment.

FIG. 16 is a functional block diagram of a remote control of the present embodiment. As shown in this figure, on the basis of the first embodiment, a "remote control (1600)" of the present embodiment comprises a "touchpad (1601)," an "icon arrangement information acquisition unit (1602)," a "distinction output unit (1603)," and a "selection output unit (1604)." Additionally, on the basis of the remote control of other embodiments, "means for acquiring depth position information," "means for depth distinction output," an "screen information acquisition unit," and "means for screen analysis" not shown in the figure may be included. The remote control of the present embodiment is characterized by further comprising a "distinction output control unit (1605)."

The "distinction output control unit (1605)" has a function for controlling of the distinction output unit so as to adjust outputs that allow judgment on a touchpad of the distinction resulting from user touching. Such distinction output control unit can be implemented by CPU, a main memory, and a distinction output control program, etc. Specifically, from among areas corresponding to a plurality of icons indicated through icon arrangement information, judgment about what area coordinates touching position information 1 (X1, Y1) detected by a touch sensor is included is executed through a CPU calculation. As a result, the distinction outputted related to the area that has been judged to contain touching position information 1 is specified as the distinction for a target of controlling.

In addition, output forms that allow the distinction specified above to be "outputs that allow judgment on a touchpad" are not particularly restricted. Specifically, in order to control outputs so that they differ from initial output forms, it is possible to easily judge that the corresponding area has been touched on a touchpad. FIG. 17 is a diagram showing an example of output forms for such distinction. As shown in 17 (*a*), for instance, output forms include an output form that allows selected distinction to be displayed in a larger manner. Alternatively, as shown in FIG. 17 (*b*), output forms also include an output form whereby a color indicating selected distinction changes. Moreover, output forms may also include an output form that deletes or dims unselected distinction, or outputs within an area defined by a dotted line. Output forms may also include an output form whereby output forms for both selected distinction and unselected distinction are changed as described above. It is acceptable to change the brightness of certain identified item or output an identified item using blinking, and it is acceptable to control outputs so that the changes, etc. can be made via animation. In case that distinction output is displayed in a depth perception manner based on superimposing of a plurality of distinction items as explained in the second embodiment, as shown in FIG. (c), output controlling may be performed so that a selected distinction item a can be positioned on the top of the layers.

Processing Flow of Fourth Embodiment

Figure 18:
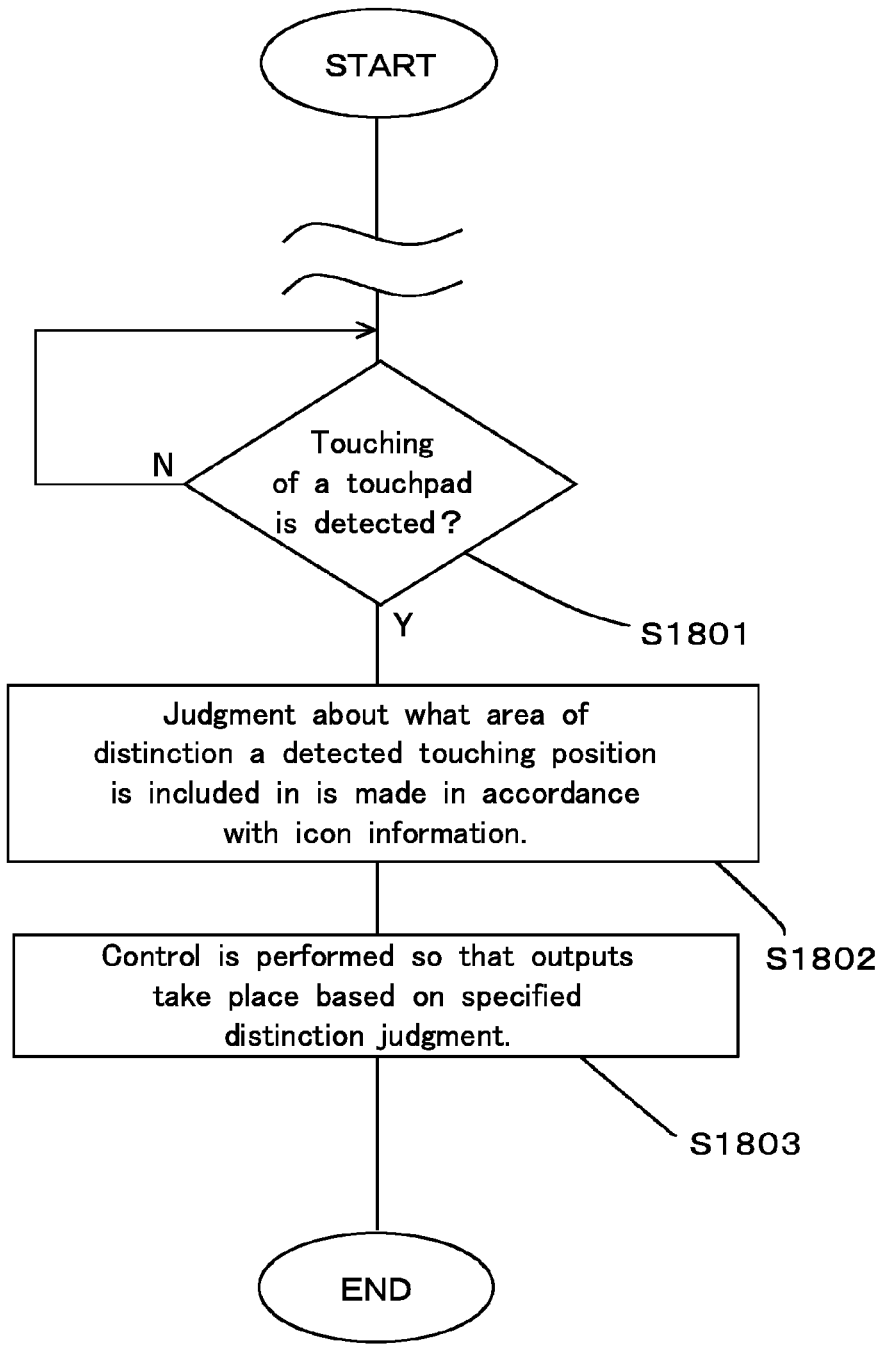
FIG. 18 is a flowchart showing processes applicable to a remote control of the fourth embodiment.

FIG. 18 is a flowchart showing processes in a remote control of the fourth embodiment. Note that, the following steps may be executed by the respective hardware configurations of the computer as above, or may configure a program, which is stored in a medium and is for controlling the computer. In addition, the flow of output processing of distinction output on a touchpad has already been described for the aforementioned embodiment, and thus, such explanation is omitted here. As shown in this figure, according to the remote control of the present embodiment, when touching of a touchpad is detected (step S1801), it is judged within what area of distinction outputted based on the icon arrangement information obtained earlier such detected touching position is included, in accordance with the touching position coordinates and distinction area coordinates (step S1802). In regards to the output for distinction that has been specified as including information on a touching position, controlling that allows output to be judged on a touchpad, such as by enlarged outputting, etc. is made (step S1803). Additionally, it is acceptable to set controlling that outputs unspecified distinction in a smaller size than that of specified distinction, and it is acceptable to control both outputs for unspecified distinction and specified distinction.

Brief Description of Effects of Fourth Embodiment

As described above, with the remote control of the present embodiment, it is possible to establish outputs that allow easy judgment for a choice of distinction touched by a user. Therefore, a user is able to confirm whether or not his or her desired distinction has been touched in a proper manner.

DESCRIPTION OF REFERENCE NUMERALS

0200: Remote control
0201: Touchpad
0202: Icon arrangement information acquisition unit
0203: Distinction output unit
0204: Selection output unit

What is claimed is:

1. A remote control provided with a function for icon selection on a GUI of a display apparatus, comprising:
   a touchpad including touch sensors;
   an icon arrangement information acquisition unit for acquiring icon arrangement information on the GUI;
   a distinction output unit, outputting distinction for touching guidance of the touch sensor on the touchpad corresponding to the icon arrangement information on the GUI;
   a selection output unit for outputting a selection signal specifying the icon of the corresponding GUI resulting from touching of the touch sensor on the touchpad performed based on the distinction;
   wherein the icon arrangement information acquisition unit comprises means for acquiring depth position information about a plurality of icons aligned in the depth direction on the GUI in order in a nested form; and
   wherein the distinction output unit comprises means for depth distinction output for outputting the distinction aligned in the depth direction for touching guidance such that the size of the distinction becomes smaller in a nested manner based on the priority given thereto, but there is no superimposition of the distinction on the touchpad based on the acquired depth position information.

2. The remote control according to claim 1, further comprising:
   a screen information acquisition unit for acquiring screen information from the display;
   wherein the icon arrangement information acquisition unit comprises,
   means for screen analysis for acquiring icon arrangement information based on the acquired screen information.

3. The remote control according to claim 1, further comprising:
   a distinction output control unit for controlling the distinction output unit so as to identify the distinction touched by a user on a touchpad.

4. A display apparatus comprising the remote control according to claim 1.

5. A television receiver comprising the remote control according to claim 1.

6. One or more non-transitory computer readable media storing a computer-executable program for a remote control provided with a function for icon selection on a GUI of a display apparatus and provided with a touchpad including touch sensors, the program, when executed by a computer, causing the computer to perform the steps of:

acquiring icon arrangement information on the GUI screen;

outputting distinction for touching guidance of the touch sensor on the touchpad corresponding to the icon arrangement information on the GUI;

outputting a selection signal specifying the icon of the corresponding GUI resulting from touching of the touch sensor on the touchpad performed based on the distinction;

wherein the step of acquiring icon arrangement information comprises the step of acquiring depth position information about a plurality of icons aligned in the depth direction on the GUI in order in a nested form; and wherein the step of outputting distinction comprises the step of outputting the distinction aligned in the depth direction for touching guidance such that the size of the distinction becomes smaller in a nested manner based on the priority given thereto, but there is no superimposition of the distinction on the touchpad based on the acquired depth position information.

7. The remote control according to claim 2, further comprising:

a distinction output control unit for controlling the distinction output unit so as to identify the distinction touched by a user on a touchpad.

8. A display apparatus comprising the remote control according to claim 2.

9. A display apparatus comprising the remote control according to claim 3.

10. A television receiver comprising the remote control according to claim 2.

11. A television receiver comprising the remote control according to claim 3.

12. A television receiver comprising the remote control according to claim 4.

\* \* \* \* \*